United States Patent Office.

HENRY ZAHN, OF DENVER, COLORADO.

ARTIFICIAL FUEL.

SPECIFICATION forming part of Letters Patent No. 478,039, dated June 28, 1892.

Application filed February 28, 1889. Serial No. 301,546. (No specimens.)

*To all whom it may concern:*

Be it known that I, HENRY ZAHN, a citizen of the United States of America, residing at Denver, in the county of Arapahoe and State of Colorado, have invented a certain new and useful Artificial Fuel, of which the following is a specification.

First. I take some solid combustible substance, preferably coke or coal-dust, either anthracite or bituminous, and if not already sufficiently fine I comminute it, the finer the better, by any suitable means, sift it to a uniform fineness, and thoroughly dry out all its free and latent moisture. In referring to this material I shall speak of it merely as "coal-dust," meaning by that term any solid combustible substance prepared as above described.

Second. A peculiar feldspathic deposit known as "geyserite," named by others "volcanic dust," has recently been discovered in large quantities in the valleys of the Republican and Loup rivers, in the State of Nebraska, and in several other places in the States of Colorado, Kansas, and Nevada, and in the Territories lying east of the Rocky Mountains. It exists in the form of microscopic dust compacted to about the hardness of soft chalk, in beds of various thickness, and when examined under the microscope is found to be composed of minute translucent scales distinctly rounded and water-worn. Its chemical composition differs somewhat in different beds, and even in different parts of the same bed, but so far as examined is found to be composed of from sixty to eighty per cent. of alumina silicate of the triclinic (feldspar, albite, orthoclase) group, and from twenty to forty per cent. of alumina, potash, soda, iron and magnesia, lime, and crystal of horneblende, but is destitute of quartz, so far as yet known. Boiled with caustic soda or potash (preferably of a strength of 76° Baumé) these translucent scales readily dissolve into a dark-green jelly of very adhesive character. I take about three parts of the geyserite to one of the caustic alkali, by weight, with the minimum of water necessary to dissolve the alkali, and boil them together under steam-pressure or in an open vessel, preferably at a temperature of 300° Fahrenheit or more, for a short time—say from thirty to sixty minutes—or until the dark-green jelly has been thoroughly formed at a strength of about 60° Baumé. The jelly at this strength being too stiff for convenient use, I dilute it with water, preferably hot, until it is reduced to about 20° Baumé, of which strength it is sufficiently fluid to flow readily. The material thus formed I term the "geyserite jelly."

Third. I take the geyserite jelly while hot and preferably boiling and run it upon the coal-dust, stirring the latter vigorously meanwhile until about three hundred pounds of the geyserite jelly have been thoroughly and uniformly incorporated with every ton of coal-dust. I do not, however, confine myself to these exact proportions, as some coal-dust will require more and others less of the geyserite jelly.

Fourth. I then remove the mass and immediately mold it under pressure into briquette of convenient size for handling. The briquettes thus formed come from the press tough and hard, so that they can be handled with impunity, and in three days become thoroughly indurated and ready for use or transportation. They possess heat-producing powers far exceeding those of coal, burn without smoke, produce no clinkers and but little ash, make no dirt or waste in handling, are more compact than coal for transportation, and in burning the albumina silicate turns into fine vitreous glass, which forms a supporting-wall and preserves the form of the briquettes until they are entirely consumed.

The materials being cheap and practically inexhaustible, the process of manufacture short, simple, and inexpensive, and the resulting article so greatly superior to coal in heat-producing qualities, in compactness, and in other points of advantage hereinbefore referred to, it results that my improved fuel, even when transported long distances, is found to be not only more satisfactory, but more economical than the mineral fuels now in common use.

For certain purposes the above-described fuel may be improved by the addition to the geyserite jelly before mixing with the coal-dust of some hydrocarbon, preferably crude petroleum or the residuum therefrom after the lighter products are distilled off; and, further, when the coal-dust used is lacking in bituminous matter a mixture of petroleum with some resinous substance may be so used with advantage. When both the hydrocarbon and the resinous substance are used and anthracite dust employed, the fuel obtained will produce the bright flame so desirable in steam-generation.

The peculiar and novel character of the fuel herein described and of its action in the furnace will be readily appreciated from the fact that when compounded of anthracite dust and baked in a coke-oven and combustion stopped at a certain stage it forms a very excellent quality of anthracite coke, affording the only instance, so far as I am aware, of the practical production of coke from anthracite coal.

I have found that ordinary feldspar properly comminuted may be employed as a substitute for the geyserite, and I find it as an inferior equivalent therefor for the purposes of my invention. It is, however, more expensive, more difficult to treat in the manufacturing process, and, so far as I have been able to ascertain by experiment, produces an article more or less inferior to that produced by the geyserite.

I claim as new and desire to secure by Letters Patent—

1. An artificial fuel consisting of the herein-described geyserite jelly and a solid combustible substance, such as coal-dust mixed together, as and for the purpose stated.

2. An artificial fuel consisting of geyserite jelly, coal-dust, and a hydrocarbon, such as crude petroleum, from which the light hydrocarbon has been distilled, mixed together, as and for the purpose stated.

HENRY ZAHN.

Witnesses:
L. HILL,
H. BITNER.